United States Patent
Kato

(10) Patent No.: US 7,690,780 B2
(45) Date of Patent: Apr. 6, 2010

(54) INK FOR INK-JET RECORDING

(75) Inventor: Masahito Kato, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 709 days.

(21) Appl. No.: 11/477,681

(22) Filed: Jun. 30, 2006

(65) Prior Publication Data

US 2007/0002112 A1 Jan. 4, 2007

(30) Foreign Application Priority Data

Jul. 1, 2005 (JP) .............................. 2005-193636

(51) Int. Cl.
*G01D 11/00* (2006.01)

(52) U.S. Cl. ................ 347/100; 347/95; 106/31.6; 523/160

(58) Field of Classification Search ............... 347/100, 347/95, 96, 101, 84, 85; 106/31.6, 31.13, 106/31.27; 523/160
See application file for complete search history.

(56) References Cited

U.S. PATENT DOCUMENTS

| 5,609,671 | A | 3/1997 | Nagasawa |
| 5,837,045 | A | 11/1998 | Johnson et al. |
| 6,808,254 | B2 | 10/2004 | Sakaida et al. |
| 6,913,349 | B2 | 7/2005 | Hirota |
| 6,953,241 | B2 | 10/2005 | Sakaida et al. |
| 2003/0079652 | A1 * | 5/2003 | Choy ...................... 106/31.58 |
| 2003/0103118 | A1 | 6/2003 | Watanabe et al. |
| 2003/0112305 | A1 * | 6/2003 | Kato et al. ................... 347/100 |
| 2003/0156164 | A1 | 8/2003 | Sakaida et al. |
| 2004/0090498 | A1 | 5/2004 | Sakaida et al. |
| 2005/0231554 | A1 | 10/2005 | Sakaida et al. |

FOREIGN PATENT DOCUMENTS

| JP | H55 29546 | 3/1980 |
| JP | H55 65269 | 5/1980 |
| JP | H62 11781 | 1/1987 |
| JP | H08 3498 | 1/1996 |
| JP | 2000 513396 | 10/2000 |
| JP | 2002 363468 | 12/2002 |
| JP | 2003 311955 | 11/2003 |

* cited by examiner

*Primary Examiner*—Manish S Shah
(74) *Attorney, Agent, or Firm*—Baker Botts, LLP.

(57) ABSTRACT

An ink for ink-jet recording is provided which enables high quality printing at a fast speed. The ink is also suitable for use in an ink-jet recording head employed in a line head method. The ink for ink-jet recording includes at least a coloring agent, ethylene glycol, propylene glycol propyl ether and water. The amount of ethylene glycol with respect to the total ink amount is about 5 wt. % to about 30 wt. %, and the amount of propylene glycol propyl ether with respect to the total ink amount is about 30 wt. % to about 50 wt. %. Further, the total amount of ethylene glycol and propylene glycol propyl ether with respect to the total ink amount is about 45 wt. % to about 60 wt. %.

6 Claims, No Drawings

INK FOR INK-JET RECORDING

BACKGROUND OF THE INVENTION

1. Field of the Invention

The present invention relates to an ink for ink-jet recording.

2. Description of the Related Art

In an ink-jet recording method, droplets of ink are formed, and all or a part of the formed ink droplets are made to adhere to recording material such as paper to thereby perform recording. In this case, the ink droplets are formed by means of an ink ejection method such as an electrostatic attraction method, a method in which mechanical vibrations or displacements are applied to ink using a piezoelectric element or the like, or a method utilizing pressure generated when a gas bubble is formed by heating ink.

As the ink-jet recording method has come into widespread use, various studies have been conducted for improving the ink. The ink employed in the ink-jet recording method is required to have various characteristics such as no blurring on recording material, capability of forming a uniform high density image, and fast drying on recording material.

It has been proposed to improve the penetrability of ink into recording material by adding a polyalcohol, a polyalcohol derivative and/or a surfactant to an ink for ink-jet recording (Japanese Patent Application Laid-Open Nos. S55-29546, S55-65269 and S62-11781). In these inks, the penetrability into recording material is significantly enhanced to improve the drying properties of an image. In this case, although the drying properties are improved, a problem arises that the extent of blurring increases in the image.

Further, it has been proposed to improve the quality, drying properties, rub fastness and the like of printed material by adding a specific organic solvent to an ink for ink-jet recording (Japanese Patent Application Laid-Open No. 2002-363468). However, this ink requires a drying time of 40 to 50 seconds after printing on paper for preventing a finger and/or paper from being smudged with the ink when a printed portion is rubbed with the finger. Thus, the ink is not considered to have sufficient drying properties.

Moreover, the technology of the abovementioned conventional ink for ink-jet recording has been developed to be applied to a so-called serial method in which printing is performed by moving an ink-jet recording head on recording material in a main scanning direction. On the other hand, a so-called line head method (Japanese Patent Application Laid-Open No. 2003-311955) employs an ink-jet recording head having a length comparable to or longer than the width of the main scanning direction of a recording material. In this case, printing is performed by allowing a recording material to pass under the ink-jet recording head only once without moving the head. The line head method has a printing speed faster than that of the serial method. Therefore, the abovementioned conventional ink for ink-jet recording has a problem that the drying properties are insufficient as an ink employed in the line head method.

SUMMARY OF THE INVENTION

The present invention has been made to solve the abovementioned problems, and it is an object of the invention to provide an ink for ink-jet recording which is capable of improving drying properties of printed text and a printed image and also of reducing blurring of the text and the image. By improving the drying properties, the ink can be adapted to ink-jet recording employing a line head method. Further, by reducing the blurring, high quality printing at a high speed can be achieved.

The present inventor has found that adequate penetrability which provides both improved drying properties adaptable to ink-jet recording employing a line head method and suppressed blurring required for high quality printing can be imparted to an ink for ink-jet recording by employing a specific solvent composition.

Accordingly, the present invention provides an ink for ink-jet recording comprising at least a coloring agent, ethylene glycol, propylene glycol propyl ether and water. The ink is characterized in that the amount of ethylene glycol with respect to the total ink amount is about 5 wt. % to about 30 wt. %, that the amount of propylene glycol propyl ether with respect to the total ink amount is about 30 wt. % to about 50 wt. %, and that the total amount of ethylene glycol and propylene glycol propyl ether with respect to the total ink amount is about 45 wt. % to about 60 wt. %.

The ink for ink-jet recording of the present invention comprises specific water-soluble organic solvents, i.e., ethylene glycol and propylene glycol propyl ether in a specific ratio. Therefore, even if ordinary paper is employed as recording material, the ink dries rapidly due to high penetrability into recording material, and smearing of the ink does not occur within five seconds after printing. Further, blurring is less likely to occur since the penetrability of the ink is not too high.

In particular, in the ink for ink-jet recording of the present invention, if a pigment is employed as the coloring agent, the coloring agent less penetrates into recording material irrespective of high penetrability of the water-soluble organic solvents into the recording material. Therefore, a high quality printed material can be obtained which is free from blurring and has sharp edges particularly in text comprising letters and ruled lines.

DETAILED DESCRIPTION OF THE PREFERRED EMBODIMENTS

The present invention will be described below in detail.

The ink for ink-jet recording of the present invention is characterized by comprising specific water-soluble organic solvents, i.e., ethylene glycol and propylene glycol propyl ether, in addition to a coloring agent and water.

Here, the amount of ethylene glycol with respect to the total ink amount is about 5 wt. % to about 30 wt. %. If the amount is less than about 5 wt. %, the penetrability of the ink into recording material such as ordinary paper becomes excessively high since the relative ratio of propylene glycol propyl ether to ethylene glycol is high. Hence, blurring is likely to occur in recording material, and the sharpness of the edges of, particularly, text is impaired. Therefore, the amount less than about 5 wt. % is not preferable. On the other hand, if the amount of ethylene glycol exceeds about 30 wt. %, the viscosity of the ink becomes excessively high to cause the penetrability of the ink into recording material to be impaired, and sufficient fast-drying properties adaptable to ink-jet recording employing a line head method are not obtained. Therefore, the amount exceeding about 30 wt. % is not preferable.

The amount of propylene glycol propyl ether with respect to the total ink amount is about 30 wt. % to about 50 wt. %. If the amount is less than about 30 wt. %, the viscosity of the ink becomes excessively low to cause the penetrability of the ink into recording material such as ordinary paper to be excessively high. Therefore, the amount less than about 30 wt. % is not preferable. On the other hand, if the amount exceeds about 50 wt. %, the penetrability of the ink into recording material such as ordinary paper becomes also excessively high to cause the sharpness of the edges of, particularly, text to be impaired. Further, the compatibility with water and ethylene glycol is lost to cause the stability as ink to be impaired. Therefore, the amount exceeding about 50 wt. % is not preferable.

In the ink for ink-jet recording of the present invention, the total amount of ethylene glycol and propylene glycol propyl ether with respect to the total ink amount is about 45 wt. % to about 60 wt. %. Even when the amount of each of ethylene glycol and propylene glycol propyl ether satisfies the above-mentioned range, if the total amount is less than about 45 wt. %, the viscosity of the ink becomes low. In this case, the sharpness of the edges of, particularly, text is impaired since the coloring agent penetrates into recording material with the solvents. Therefore, the total amount less than about 45 wt. % is not preferable. On the other hand, if the total amount exceeds about 60 wt. %, the viscosity of the ink becomes excessively high, causing the ejection of the ink from nozzles of an ink-jet recording head to be unstable. Therefore, the total amount exceeding 60 wt. % is not preferable.

In the ink for ink-jet recording of the present invention, for black color which is frequently employed for printing, particularly, text and lines, a coloring agent insoluble in water and a water-soluble organic solvent is preferable for preventing blurring. Thus, preferably, a pigment is employed as the coloring agent. More preferably, a self-dispersing type pigment which can be dispersed in water without using a dispersing agent (which property is referred to as "self-dispersibility" herein) is employed. The self-dispersing type pigment can be obtained by subjecting a pigment to a surface treatment such that at least one hydrophilic group such as a carbonyl group, a carboxyl group, a hydroxyl group, a sulfone group or a salt thereof is bound to the surface of the pigment. Specific examples of the surface treatment include a method disclosed in U.S. Pat. No. 5,609,671 and a method disclosed in WO97/48769. Alternatively, a commercial product may be employed. Specific examples of the useable self-dispersing type pigment dispersing in water include, but are not limited to, CAB-O-JET (a registered trademark) 200, 300 (products of Cabot Corporation), BONJET (a registered trademark) CW1 (product of Orient Chemical Industries, Ltd.) and the like.

The preferred amount of the pigment depends on the desired printing density and the like. If the amount is too low, the printing density is not satisfactory on recording material such as paper. If the amount is too high, clogging is likely to occur in nozzles of an ink-jet recording head. Therefore, the solid amount of the pigment with respect to the total ink amount is preferably about 1 wt. % to about 10 wt. %, and more preferably about 3 wt. % to about 7 wt. %.

In the ink for ink-jet recording of the present invention, the water employed is not ordinary water containing ions but preferably is deionized water. The amount of water depends on the composition such as the amounts of the employed ethylene glycol and propylene glycol propyl ether, the amount of the coloring agent and the desired ink properties. Normally, the amount with respect to the total ink amount is about 30 wt. % to about 54 wt. %.

The ink for ink-jet recording of the present invention may comprise, in addition to the above components, other conventionally known additives in accordance with need. Examples of the additives include: surfactants; viscosity modifiers such as polyvinyl alcohol and cellulose; surface tension modifiers, mildewproofing agents; anticorrosive agents; or the like.

The ink for ink-jet recording of the present invention may be employed in ink-jet recording using an ink-jet recording head of a conventional serial method and also in ink-jet recording using an ink-jet recording head of a line head method in which adaptability to faster recording is required. Moreover, paper such as ordinary paper generally usable in ink-jet recording may be employed as recording material.

EXAMPLES

The present invention will next be specifically described by way of Examples and Comparative Examples. Examples 1 to 7 and Comparative Examples 1 to 17

(1) Preparation of Inks

The ink for ink-jet recording of Example 1 was prepared by means of the method described hereinafter, and each of the inks of the other Examples and the Comparative Examples was prepared by a similar method. The composition of each of the inks (wt. % with respect to the total ink amount) is shown in Table 1.

Preparation Method of the Ink of Example 1

13.7 parts by weight of deionized water, 30 parts by weight of ethylene glycol and 30 parts by weight of propylene glycol propyl ether were mixed to prepare 73.7 parts by weight of an ink solvent. Subsequently, 73.7 parts by weight of the prepared ink solvent was gradually added to 26.3 parts by weight of CAB-O-JET (a registered trademark) 300 (product of Cabot Corporation, carbon black concentration=approximately 15 wt. %, balance: water) under stirring. The mixture was continued to stir for 30 minutes and filtrated with a membrane filter having a pore size of 2.5 µm to prepare the ink. The amount of carbon black with respect to the total ink amount was approximately 4 wt. %.

(2) Evaluation (2-1) Compatibility Evaluation

Compatibility evaluation was performed for determining whether or not the water and the water-soluble organic solvents employed in the ink were miscible without separating from each other.

For each of the inks of Examples 1 to 7 and Comparative Examples 1 to 17, the compatibility was evaluated as follows. The results are shown in Table 1.

G: Compatible.

NG: Not compatible.

(2-2) Preparation of Print Samples

Each of the inks evaluated as "G" in the compatibility evaluation (2-1) was filled into a predetermined ink cartridge, and the cartridge was attached to a digital multifunction device equipped with an ink-jet printer (MFC-5200J, product of Brother Industries, Ltd.) to prepare a print sample.

The print sample was printed on ordinary paper (DATA COPY paper, product of m-real), and text was mainly printed.

(2-3) Evaluation of Ejection Stability

Evaluation of ejection stability was performed based on the presence or absence of print failures such as ejection delay, ejection bending (a phenomenon in which ink droplets are not straight ejected from a nozzle) and print dropouts.

Each of the print samples prepared in (2-2) was observed to evaluate the ejection stability by use of the following criteria. The results are shown in Table 1. Here, the symbol "-" in the Table represents that the evaluation was not performed.

G: Ejection is stable (no print failures).

NG: Ejection is unstable, and the print sample cannot be prepared (print failures found).

If the ejection stability was evaluated as "G", evaluation of paper drying properties and feathering evaluation were performed. However, if the ejection stability was evaluated as "NG", further evaluation was not performed.

(2-4) Evaluation of Paper Drying Properties

Paper drying properties are drying properties of ink on paper after printing.

Each of the print samples prepared in (2-2) was rubbed with a finger at 5 seconds and 15 seconds after the printing. Subsequently, smearing of the ink was visually observed, and the effects on an image were evaluated by the following criteria. The results are shown in Table 1. Here, the symbol "-" in the Table represents that the evaluation was not performed.

A: No smearing is found at 5 seconds after printing.
B: No smearing is found at 15 seconds after printing.
C: Smearing is noticeable at 15 seconds after printing.

(2-5) Feathering Evaluation

Feathering is fine scale blurring of the penetrated ink on paper caused by the presence of fiber and space in recording material. The sharpness of the edges of text on a printed material can be evaluated through the feathering evaluation.

By use of the print samples prepared in (2-2), feathering was evaluated by the following criteria. The results are shown in Table 1. Here, the symbol "-" in the Table represents that the evaluation was not performed.

A: No feathering is found. The edges of text are sharp.
B: Feathering is noticeable to some extent.
C: Feathering is highly noticeable. The edges of text are not sharp.

Each of the inks of Examples 1 to 7 comprises water, ethylene glycol, propylene glycol propyl ether and a self dispersing type pigment (CAB-O-JET (a registered trademark) 300 (product of Cabot Corporation)) serving as a coloring agent insoluble in water. In each of the inks, the amount of ethylene glycol is in the range of from 5 wt. % to 30 wt. %, and the amount of propylene glycol propyl ether is in the range of from 30 wt. % to 50 wt. %. In addition, the total amount of ethylene glycol and propylene glycol propyl ether is in the range of from 45 wt. % to 60 wt. %. Therefore, the compatibility, the ejection stability, the paper drying properties and the feathering were all excellent.

However, in Comparative Examples 1, 2, 4 and 5, the total amount of ethylene glycol and propylene glycol propyl ether exceeds 60 wt. %. In these cases, the viscosity of the ink was high to cause ink ejection from nozzles of an ink-jet head to be unstable. Therefore, the print samples could not be prepared.

In Comparative Example 6, the total amount of ethylene glycol and propylene glycol propyl ether exceeds 60 wt. %, and the amount of propylene glycol propyl ether also exceeds 50 wt. %. Therefore, the compatibility with water and ethylene glycol was lost, and this ink did not serve as ink.

In each of Comparative Examples 3 and 7, the relative amount of propylene glycol propyl ether in the water-soluble organic solvents is low. In theses cases, the viscosity of the ink was low to cause the penetrability to be high. Therefore, the paper drying properties were improved, but feathering was noticeable to some extent.

In Comparative Example 8, the total amount of ethylene glycol and propylene glycol propyl ether is low. In this case, the viscosity of the ink was low to cause the penetrability to be excessively high, and feathering was noticeable to some extent.

In Comparative Example 9, ethylene glycol is not comprised, and thus the relative amount of propylene glycol propyl ether with respect to ethylene glycol is excessively high as compared to that of Example 4. Therefore, the penetrability was enhanced, and thus the paper drying properties was improved. However feathering was highly noticeable.

Each of Comparative Examples 10 to 17 is an example in which another water soluble organic solvent is employed in place of ethylene glycol or propylene glycol propyl ether. In all the cases, the ink was not stably ejected from nozzles of an ink-jet recording head, or the water-soluble organic solvent was not completely compatible with water. Therefore, these inks were not suitable for use as an ink for ink-jet recording.

TABLE 1

| | Ink Composition (wt. %) | | | | | | | | |
| --- | --- | --- | --- | --- | --- | --- | --- | --- | --- |
| | CAB-O-JET® 300*[1] | Organic Solvent | | | | | | | |
| | | EG | PGPE | PG | DEG | GL | DPPE | iBDG | DEGBE | DEGDEE |
| Ex. 1 | 26.3*[2] | 30 | 30 | | | | | | | |
| Ex. 2 | 26.3*[2] | 20 | 40 | | | | | | | |
| Ex. 3 | 26.3*[2] | 20 | 30 | | | | | | | |
| Ex. 4 | 26.3*[2] | 10 | 50 | | | | | | | |
| Ex. 5 | 26.3*[2] | 10 | 40 | | | | | | | |
| Ex. 6 | 26.3*[2] | 10 | 35 | | | | | | | |
| Ex. 7 | 26.3*[2] | 5 | 45 | | | | | | | |
| Com. Ex. 1 | 26.3*[2] | 33 | 40 | | | | | | | |
| Com. Ex. 2 | 26.3*[2] | 30 | 40 | | | | | | | |
| Com. Ex. 3 | 26.3*[2] | 30 | 20 | | | | | | | |
| Com. Ex. 4 | 26.3*[2] | 20 | 50 | | | | | | | |
| Com. Ex. 5 | 26.3*[2] | 15 | 50 | | | | | | | |
| Com. Ex. 6 | 26.3*[2] | 10 | 60 | | | | | | | |
| Com. Ex. 7 | 26.3*[2] | 10 | 20 | | | | | | | |
| Com. Ex. 8 | 26.3*[2] | 7 | 30 | | | | | | | |
| Com. Ex. 9 | 26.3*[2] | | 50 | | | | | | | |
| Com. Ex. 10 | 26.3*[2] | | 40 | 20 | | | | | | |
| Com. Ex. 11 | 26.3*[2] | | 40 | | 20 | | | | | |
| Com. Ex. 12 | 26.3*[2] | | 40 | | | 20 | | | | |
| Com. Ex. 13 | 26.3*[2] | 20 | | | | | 40 | | | |
| Com. Ex. 14 | 26.3*[2] | 20 | | | | | | 40 | | |
| Com. Ex. 15 | 26.3*[2] | 20 | | | | | | | 40 | |
| Com. Ex. 16 | 26.3*[2] | 20 | | | | | | | | 40 |

TABLE 1-continued

| | | | | | | |
|---|---|---|---|---|---|---|
| Com. Ex. 17 | 26.3*² | 20 | | | | |

| | Ink Composition (wt. %) | | | Evaluation | | | |
|---|---|---|---|---|---|---|---|
| | Organic Solvent | | Deionized | | Ejection | Paper drying | |
| | BTG | Total | Water | Compatibility | stability | properties | Feathering |
| Ex. 1 | | 60 | 13.7 | G | G | A | A |
| Ex. 2 | | 60 | 13.7 | G | G | A | A |
| Ex. 3 | | 50 | 23.7 | G | G | A | A |
| Ex. 4 | | 60 | 13.7 | G | G | A | A |
| Ex. 5 | | 50 | 23.7 | G | G | A | A |
| Ex. 6 | | 45 | 28.7 | G | G | A | A |
| Ex. 7 | | 50 | 23.7 | G | G | A | A |
| Com. Ex. 1 | | 73 | 0.7 | G | NG | — | — |
| Com. Ex. 2 | | 70 | 3.7 | G | NG | — | — |
| Com. Ex. 3 | | 50 | 23.7 | G | G | A | B |
| Com. Ex. 4 | | 70 | 3.7 | G | NG | — | — |
| Com. Ex. 5 | | 65 | 8.7 | G | NG | — | — |
| Com. Ex. 6 | | 70 | 3.7 | NG | — | — | — |
| Com. Ex. 7 | | 30 | 43.7 | G | G | A | B |
| Com. Ex. 8 | | 37 | 36.7 | G | G | A | B |
| Com. Ex. 9 | | 50 | 23.7 | G | G | A | C |
| Com. Ex. 10 | | 60 | 13.7 | G | NG | — | — |
| Com. Ex. 11 | | 60 | 13.7 | G | NG | — | — |
| Com. Ex. 12 | | 60 | 13.7 | NG | — | — | — |
| Com. Ex. 13 | | 60 | 13.7 | NG | — | — | — |
| Com. Ex. 14 | | 60 | 13.7 | G | NG | — | — |
| Com. Ex. 15 | | 60 | 13.7 | G | NG | — | — |
| Com. Ex. 16 | | 60 | 13.7 | NG | — | — | — |
| Com. Ex. 17 | 40 | 60 | 13.7 | G | NG | — | — |

*¹CAB-O-JET ® 300 (product of Cabot Corporation, Carbon black concentration = approximately 15 wt. %)
*²The amount of Carbon black with respect to the total ink amount = approximately 4 wt. %.
*Abbreviation of solvents
EG = ethylene glycol
PGPE = propylene glycol propyl ether
PG = propylene glycol
DEG = diethylene glycol
GL = glycerin
DPPE = dipropylene glycol propyl ether
iBDG = diethylene glycol isobutyl ether
DEGBE = diethylene glycol butyl ether
DEGDEE = diethylene glycol diethyl ether
BTG = triethylene glycol n-butyl ether The ink for ink-jet recording of the present invention is useful as an ink for ink-jet recording enabling high quality printing at a fast speed.

The entire disclosure of the specification, claims and summary of Japanese Patent Application No. 2005-193636 filed on Jul. 1, 2005 is hereby incorporated by reference.

What is claimed is:

1. An ink for ink-jet recording comprising at least a coloring agent, ethylene glycol, propylene glycol propyl ether and water, wherein
an amount of ethylene glycol with respect to a total ink amount is about 5 wt. % to about 30 wt. %, an amount of propylene glycol propyl ether with respect to the total ink amount is about 30 wt. % to about 50 wt. %, and a total amount of ethylene glycol and propylene glycol propyl ether with respect to the total ink amount is about 45 wt. % to about 60 wt. %.

2. The ink for ink-jet recording according to claim 1, wherein a pigment is employed as the coloring agent.

3. The ink for ink-jet recording according to claim 2, wherein the pigment is a pigment having a self-dispersibility in water.

4. The ink for ink-jet recording according to claim 1, wherein color of the coloring agent is black.

5. The ink for ink-jet recording according to claim 2, wherein the solid amount of the pigment with respect to the total ink amount is about 1 wt. % to about 10 wt. %.

6. The ink for ink-jet recording according to claim 1, wherein the amount of water with respect to the total ink amount is about 30 wt. % to about 54 wt. %.

* * * * *